Jan. 28, 1958 J. E. FIELDEN Re. 24,420

MEASUREMENT OF CONDUCTIVITY OF LIQUIDS

Original Filed June 17, 1952

Inventor
J. E. Fielden
By Glascock Downing & Seebold Attys.

United States Patent Office

Re. 24,420
Reissued Jan. 28, 1958

24,420

MEASUREMENT OF CONDUCTIVITY OF LIQUIDS

John E. Fielden, Sale, England, assignor, by mesne assignments, to Robertshaw-Fulton Controls Company, Greensburg, Pa.

Original No. 2,709,785, dated May 31, 1955, Serial No. 293,901, June 17, 1952. Application for reissue February 4, 1957, Serial No. 639,598

7 Claims. (Cl. 324—65)

Matter enclosed in heavy brackets [ ] appears in the original patent but forms no part of this reissue specification; matter printed in italics indicates the additions made by reissue.

This invention relates to means for measuring the electrical conductivity of liquids, and has for its object to provide an arrangement which does not require electrodes making electrical contact with the liquid and thereby avoids the difficulties usually caused by polarisation. The invention is applicable especially in the case of corrosive liquids which rapidly attack such electrodes, and in the case of liquids which might be contaminated by products of electrolysis. It can be used for testing liquids flowing through pipes.

According to the invention, an electric current is induced in the liquid or a part thereof, electro-magnetically, and the magnitude of the current, as determined by inducing a current in a circuit including a measuring instrument or by the reflected change in impedance in the associated inductive circuit, is used as a measure of the conductivity.

One convenient arrangement in accordance with the invention has an insulating tube for the liquid forming a closed loop linked with two transformer cores, one of which carries a primary winding adapted to be supplied with alternating current and the other of which carries a secondary winding connected to a measuring instrument calibrated to indicate the conductivity of the liquid.

In another arrangement in accordance with the invention, the liquid is caused to enter or flow through a closed tube loop of glass or other insulator which is wound around or linked with an iron core. On the same iron core is wound a wire coil which may form one arm of an impedance bridge or other impedance measuring circuit. An alternating current is applied to the bridge and the current flowing through the coil induces a current in the liquid in the short circuited tube loop. This results in a change in the impedance of the primary coil, depending on the conductivity of the liquid, the change being measured and used as an indication of the conductivity.

Instead of passing liquid through a glass tube coil, a closed iron circuit having one wire coil wound on it and suitably covered with an insulating material which would not be attacked by the liquid, leaving the space within the core open, may be immersed in the liquid. The coil is connected to a bridge or other impedance measuring circuit, and a current is induced in the bulk of the liquid surrounding the core.

Referring to the accompanying drawing.

Figure 1:
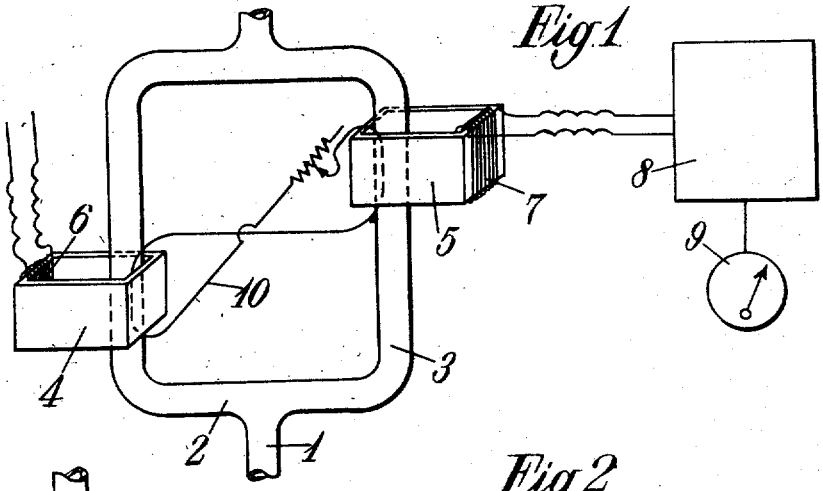
Figure 1 illustrates diagrammatically one form of apparatus according to the invention.

Referring to Figure 1, the liquid under test is introduced into a pipe 1 of insulating material such as glass which has two branches 2, 3 forming a closed loop. The branches 2, 3 are linked with transformer cores 4, 5 respectively. The core 4 has a primary winding 6 which is connected to an alternating current source, and the core 5 has a secondary winding 7 which is connected to an amplifier 8. The pipe loop containing the liquid serves as a secondary winding on transformer core 4 and as a primary winding on core 5 and provides coupling between the two cores whereby the alternating current in primary winding 6 is enabled to induce a current in secondary winding 7. The transformer on core 5 serves as a matching transformer to match the low impedance of the liquid loop to the amplifier impedance and applies a voltage to the amplifier, depending in magnitude on the conductivity of the liquid. The amplifier output is indicated by a meter 9.

In order to avoid interaction between the transformer cores, these may be placed at right angles to one another, the pipe branches 2 and 3 being skew instead of in one plane as shown. Alternatively the cores may be staggered as illustrated. A balancing winding 10, including a variable resistance may be provided if desired, which is linked with one core in the same direction as, and with the other core in the opposite direction to, the pipe loop.

Figure 2:
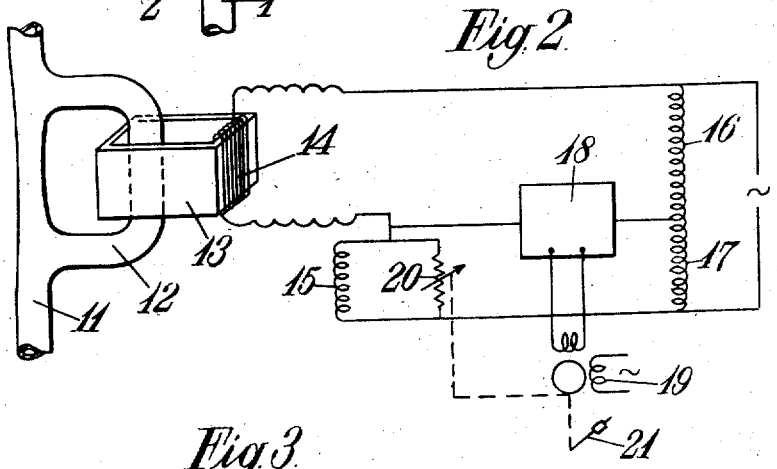
Figure 2 shows another form of the apparatus.

In the arrangement shown in Figure 2, the pipe 11 containing the liquid has a branch 12 forming a loop, which is short-circuited by the pipe 11 and which is linked with a transformer core 13, on which is wound a secondary winding 14 forming one arm of a bridge having another winding 15 in an adjacent arm and windings 16, 17 forming other arms. An alternating current is applied to the bridge, and an amplifier 18 is connected across the bridge between the junction of windings 14, 15 and the junction of windings 16, 17. The amplifier output is applied to a split-phase reversing servo-motor 19, which adjusts a potentiometer 20 connected across winding 15, and drives an indicator or recording pen 21.

If the bridge is initially balanced, a change in the conductivity of the liquid causes a corresponding change in the impedance of winding 14, and unbalances the bridge. The amplifier 18 then provides an output to the motor 19 which causes the motor to rotate in the appropriate direction to adjust the potentiometer 20 to bring the bridge back to balance, and adjust the indicator or pen 21 to indicate or record the change of conductivity.

Figure 3:
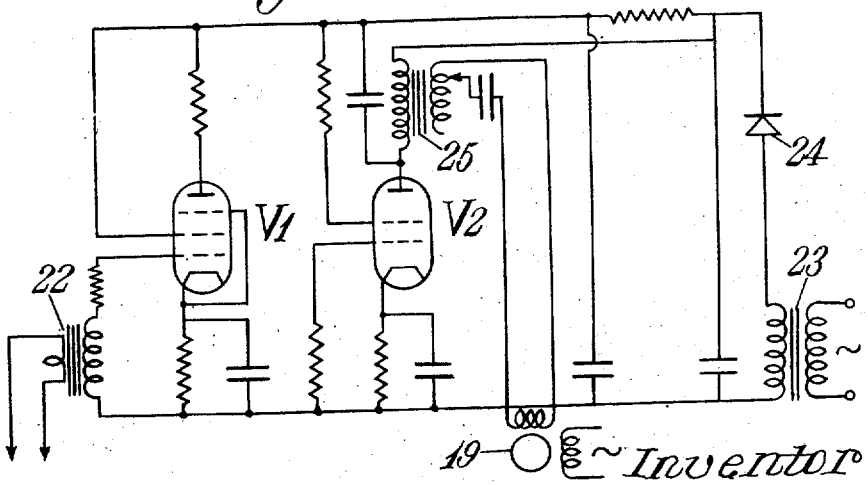
Figure 3 shows a suitable amplifier circuit for use in the apparatus shown in Figure 2.

An amplifier circuit suitable for use with this arrangement is shown in Figure 3. The alternating out-of-balance volage of the bridge is applied by a transformer 22 to the control grid of a valve V1, the phase of this input voltage depending on the direction in which the bridge has become unbalanced. The voltage is amplified by V1, and applied by way of a resistance-capacity coupling to a second valve V2. The valves are supplied with direct high tension by a mains transformer 23 and rectifier 24.

In the anode circuit of the output valve V2 there is a transformer 25, the secondary of which feeds the driving winding of the motor 19, the other winding being supplied with an alternating reference voltage. The motor runs only when the driving winding is supplied with a voltage which is 90° out of phase with the reference voltage. When a signal is developed in the output transformer 25, it causes the motor to rotate in a direction dependent on the phase of the applied voltage, which in its turn depends on the direction of unbalance of the bridge.

The indicating or recording instruments 9, 21 are suitably calibrated to indicate the conductivity of the liquid. The pipe loops may be connected in a pipe through which a liquid is flowing, so that the instrument gives a constant check on the conductivity.

What I claim is:

1. Means for measuring the electrical conductivity of liquids, comprising an insulating tube for the liquid forming a closed loop, a transformer core with which the liquid tube is linked, a winding on the core, the impedance of which is influenced by the conductivity of the tube loop, an impedance bridge of which said winding forms one member, means for applying an alternating current to the bridge and a measuring instrument connected across the bridge to measure the impedance of the said winding and calibrated to indicate the conductivity of the liquid.

2. Means as claimed in claim 1, in which the measuring instrument comprises a phase-sensitive motor and an amplifier feeding the motor, the motor rotating when the bridge is unbalanced in a direction depending on the direction of unbalance of the bridge to operate recording or indicating means.

3. Means as claimed in claim 2, and having means driven by the motor for varying the impedance of one of the bridge arms to restore the balance of the bridge.

4. Means as claimed in claim 1 and having the liquid tube loop connected in a pipe through which the liquid is flowing.

*5. In a device responsive to changes in the conductivity of a liquid and having a source of alternating voltage, the combination comprising an insulating container for the liquid, a transformer core surrounding said container, an impedance winding on said core and positioned to have the impedance thereof influenced by the conductivity of the liquid, an impedance bridge having input and output terminals, means for connecting said winding as one element of said bridge, means for connecting the source across said input terminals, and a device responsive to the condition of balance of said bridge connected to said output terminals.*

*6. In a device responsive to changes in the conductivity of a fluid and having a source of alternating voltage, the combination comprising an insulating tube for the fluid, a transformer core surrounding said tube, an impedance winding positioned on said core to have the impedance thereof influenced by the conductivity of the fluid, an impedance bridge having input and output terminals, means for connecting said winding to said bridge as one element thereof, means for impressing the voltage of the source across said input terminals, and means responsive to the condition of bridge balance connected to said output terminals.*

*7. In a device responsive to changes in the conductivity of a fluid and having a source of alternating voltage, the combination comprising an insulating tube for the fluid forming a closed loop, a transformer core surrounding said tube and linked thereto, an impedance winding positioned on said core to have the impedance thereof influenced by the conductivity of the fluid, an impedance bridge having input and output terminals, means for connecting said winding to said bridge as one element thereof, means for impressing the voltage of said source across said input terminals, and means responsive to the condition of bridge balance connected to said output terminals.*

References Cited in the file of this patent or the original patent

UNITED STATES PATENTS

| | | |
|---|---|---|
| Re. 21,003 | Knerr et al. | Feb. 14, 1939 |
| 1,610,971 | Ruben | Dec. 14, 1926 |
| 2,250,703 | Crites et al. | July 29, 1941 |
| 2,421,583 | Stuart | June 3, 1947 |
| 2,481,345 | Reynst | Sept. 6, 1949 |
| 2,540,589 | Long | Feb. 6, 1951 |
| 2,542,057 | Relis | Feb. 20, 1951 |
| 2,625,588 | Peters | Jan. 13, 1953 |
| 2,645,563 | Jensen | July 14, 1953 |